Figures 1, 2:
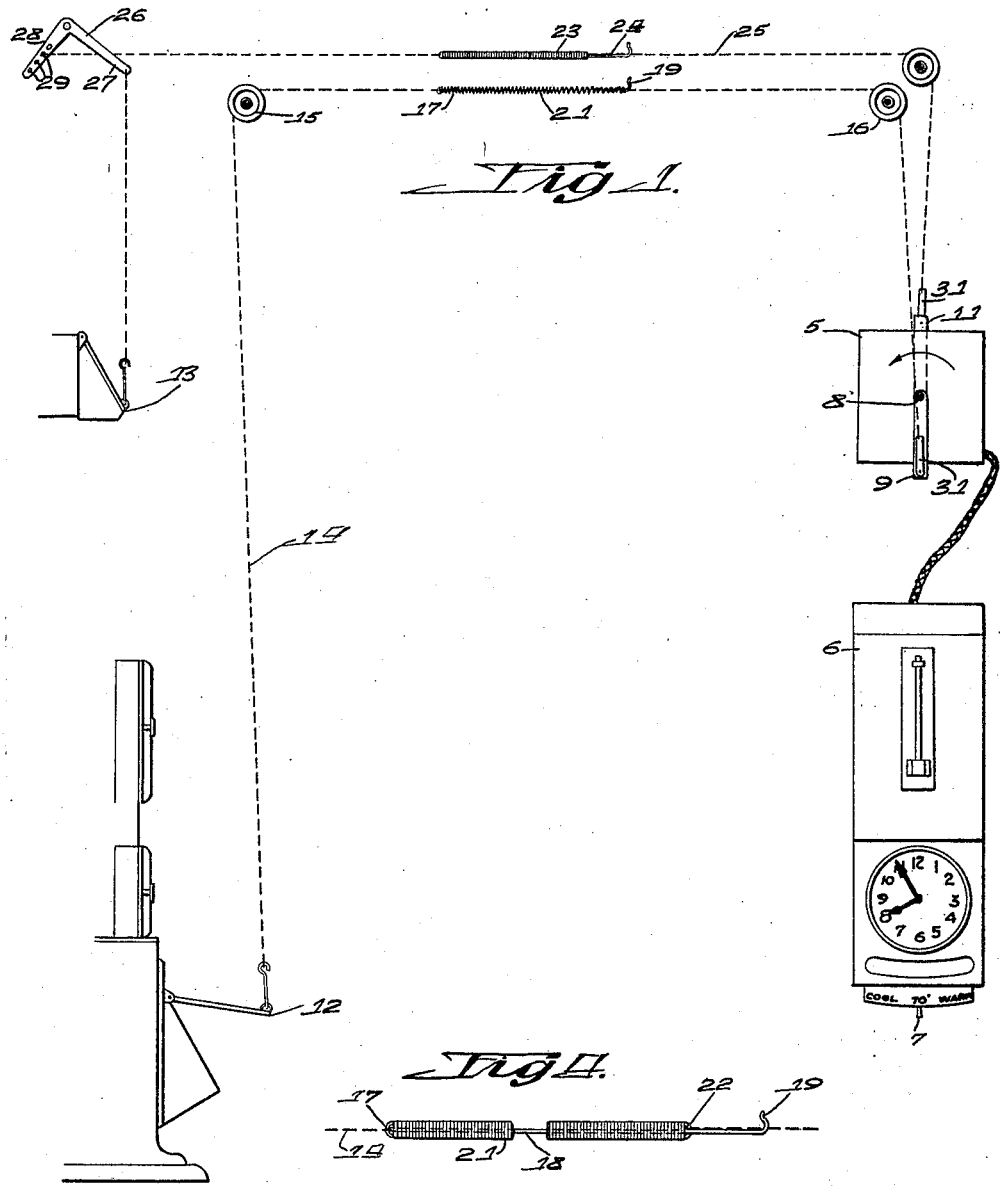

June 3, 1924.

J. G. KNODLE

DAMPER OPERATOR

Filed Feb. 26, 1921

1,496,234

2 Sheets-Sheet 1

Inventor
John G. Knodle
By Ira Morlan
Atty.

June 3, 1924.
J. G. KNODLE
DAMPER OPERATOR
Filed Feb. 26, 1921    2 Sheets-Sheet 2
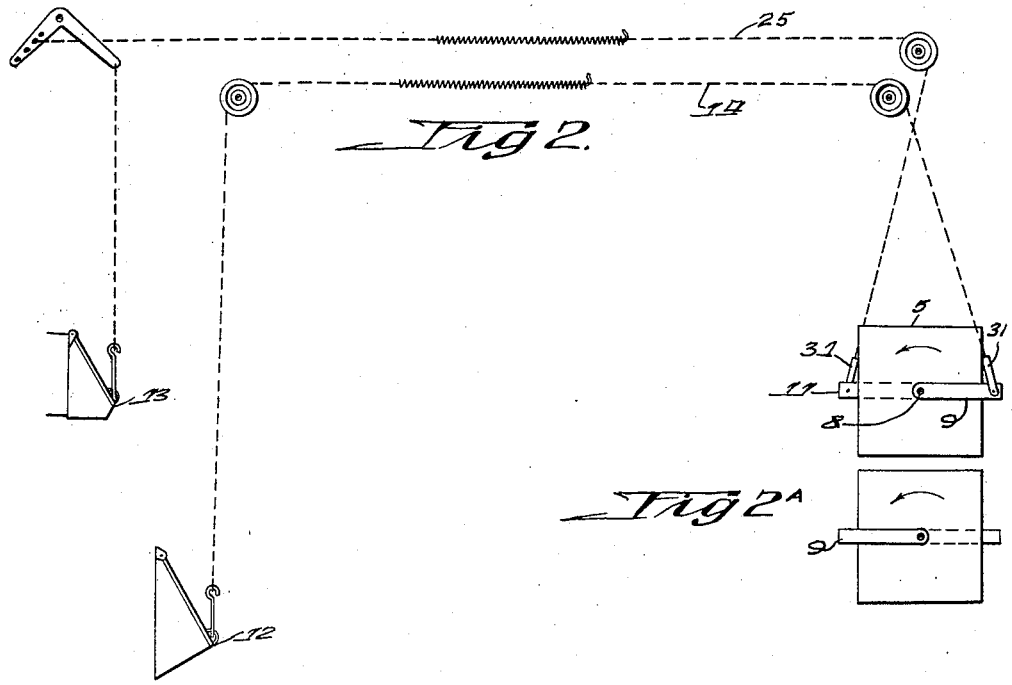
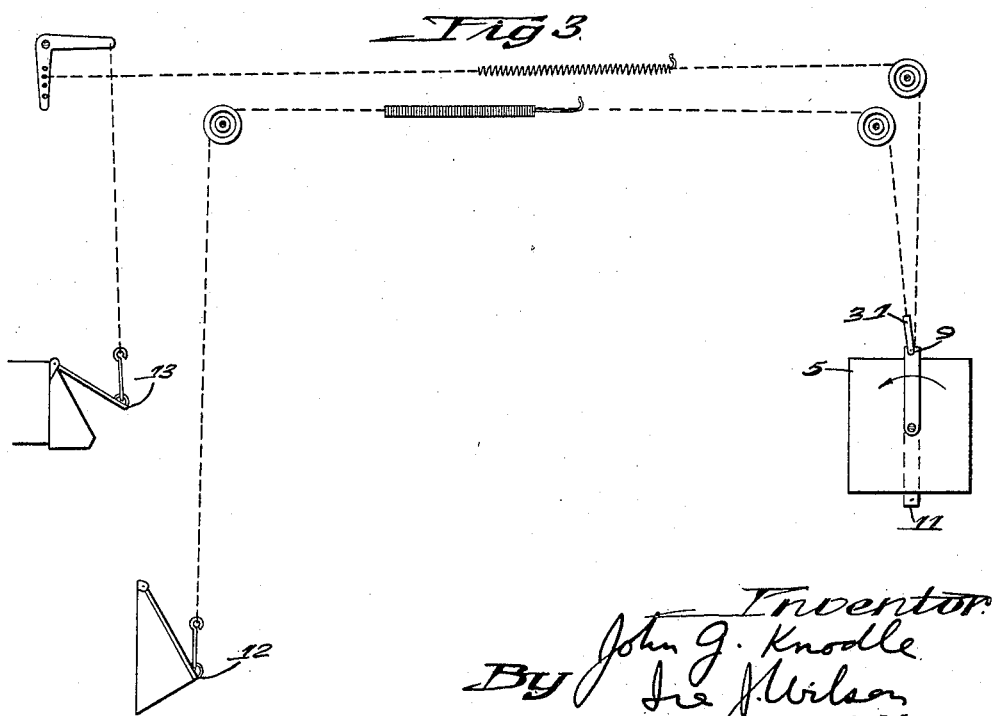

Patented June 3, 1924.

1,496,234

UNITED STATES PATENT OFFICE.

JOHN G. KNODLE, OF ROCKFORD, ILLINOIS.

DAMPER OPERATOR.

Application filed February 26, 1921. Serial No. 448,058.

*To all whom it may concern:*

Be it known that I, JOHN G. KNODLE, a citizen of the United States, residing at Rockford, in the county of Winnebago and State of Illinois, have invented certain new and useful Improvements in Damper Operators, of which the following is a specification.

This invention relates in general to heat regulators, and has more particular reference to that class in which the draft and check dampers are automatically regulated by a thermostatic control.

Heat regulators of this class are characterized by the provision of a suitable motor controlled by a thermostat for operating the draft and check dampers for the purpose of maintaining a given temperature in the room to be heated, and also to insure a minimum consumption of coal for maintaining such temperature. Heretofore, the motor and connections between the same and the dampers have been so constructed that the check damper will be closed and the draft damper opened, or vice versa; and in other constructions the draft and check dampers will be opened and closed respectively in step by step movements. In no instance prior to my invention, so far as I am aware, have the dampers been so operated that one will be closed and the other opened, and vice versa, and so that both will be closed under certain conditions. This operation is very desirable as it gives an intermediate control which serves very effectually for holding a given temperature under certain conditions longer than is possible with other means of control. The primary object, therefore, of the present invention is to provide a novel damper operating means which shall automatically cause the check damper to be closed and the draft damper opened and vice versa; and which shall, intermediate these movements, cause both dampers to be closed at the same time.

In furtherance of the foregoing, I have provided in combination with a four-stop motor and a thermostatic control therefor, novel connections between the motor and the dampers, whereby the latter may be operated in a particularly advantageous manner.

Other objects and attendant advantages will be appreciated by those familiar with this art as the invention becomes better understood by reference to the following description when considered in connection with the accompanying drawings, in which—

Figure 1 is a diagrammatic view of a heat regulating means embodying my invention;

Figs. 2, 2ª and 3, diagrammatic views showing different positions of the dampers; and Fig. 4, a detail view of a spring element used in the connections between the motor and dampers.

It is well known in this art to employ either a spring or an electrically operated motor controlled by a thermostat for operating the check and draft dampers. Inasmuch as my present invention has no reference to the particular construction of the motor and thermostat or equivalent, or suitable devices for performing the same function, I have deemed it unnecessary to illustrate in detail the construction of these parts. The motor and thermostat may, however, be of the type disclosed in Patent No. 1,263,497 granted April 23, 1918 to E. H. White.

In Fig. 1, a motor is represented diagrammatically by numeral 5, and a thermostatic control therefor, by 6, the latter having an indicator 7 adapted to be set in connection with a suitable plate having temperature indicia thereon for governing operation of the dampers. The rotary shaft 8 of the motor shown is equipped with a pair of diametrically opposed arms 9 and 11, the former of which is connected to the draft damper 12 which will be presently described, and the latter to the check damper 13 by means which will be presently described. In the present invention, I prefer that the motor shall have a four-stop movement, that is, the shaft 8 shall be revolved in step by step movements of 90 degrees each, as in a counter-clockwise direction viewing Fig. 1. It will be manifest to those familiar with this art that these movements may be effected by either a spring or an electric motor controlled by a thermostat, and that such motor and thermostat are well known and may be purchased on the market.

The connection between the arm 9 and draft damper 12 comprises a suitable chain 14 trained over pulleys 15 and 16 and includes a spring element, which affords certain lost motion. That is, the damper end of the chain 14 is attached at 17 to a rod 18 having a turned end 19 forming a stop, and a compression spring 21 on the rod 18 is attached at 17 to the damper end of the chain 14, and at its opposite end 22 to the motor end of said chain. A similar construction comprising a spring 23 and a rod 24, is interposed in the chain 25 which connects the motor arm 11 and the check damper 13. There is also included in this chain connection suitable means for increasing the movement, such for example as a bell crank lever 26 having a relatively long arm 27, and an arm 28 provided with spaced holes 29, permitting a short lever attachment of the chain, so that a given chain movement, imparted by the motor arm 11, will be multiplied by the bell crank lever, as will be obvious. By adjusting the horizontal reach of the chain 25 in the holes 29, the check damper 13 may be opened to greater or less extent. Each chain connection 14 and 25 is of such length, and each spring 21 and 23 is of such tension that when its respective damper is closed and its motor arm is in the highest position (as for example with the arm 11 in Fig. 1 and the arm 9 in Fig. 3), the spring will be contracted on its rod without appreciably slackening the chain. When now either motor arm is moved from its highest position to the half-way position, the spring will be expanded until the stop 19 is reached, without affecting the position of its damper. In other words, movement of either motor arm from its highest position to the midway position does not open its respective damper. Upon continued movement, however, of the motor arm to the lowest position, its damper will be opened by reason of the fact that the chain connection is of a permanent length. Similarly when either motor arm moves from its lowest position, upwardly to a midway position, its damper will be closed by action of the spring contracted to normal condition. As a result of the foregoing, I am able to close the check when the damper is closed and also to close the damper when the check is closed. This will be readily seen from the following:

Fig. 1 shows the indicator 7 set at 70 degrees, which temperature it is desired to maintain. Under the hypothetical case assumed, the temperature in the room to be heated is below 70 degrees, consequently, the motor has been operated to open the draft 12 and close the check 13. This operation of the dampers is effected as plainly shown in Fig. 1, when the arms 9 and 11 are vertically disposed, with the arm 9 lowermost. In this position, the end 22 of the spring 21 is pulling against the stop 19 so that the draft damper 12 has been raised as by an inelastic chain connection. The motor lever 11 being in its highest position slackens the chain 25 and allows the spring 23 to contract as shown, with the check closed. When the temperature rises to 70 degrees by reason of the open draft the motor will be operated a quarter revolution as shown in Fig. 2, thereby closing the draft without affecting the check. The check damper remains closed by reason of the fact that its weight overcomes the pressure required to lengthen the spring 23 to the stop on its rod 24, which defines the limit of movement of the arm 11 in the mid-position. By allowing the check to remain closed at this time, a more even control of the fire is maintained, tending to hold the temperature at the desired point and also preventing the escape of smoke or fumes in the event that soft coal is used. If the temperature rises one or two degrees above 70 degrees, the motor will be put into operation again by the thermostatic control moving the arms 9 and 11 another quarter of a revolution as shown in Fig. 3, thereby opening the check without disturbing the draft damper. Thus, the fire will be checked, and when the temperature falls to 70 degrees, the motor will be operated again, moving the arms 9 and 11 to the next succeeding position shown in Fig. 2ª, thereby closing the check without disturbing the draft and tending to maintain the heat at the 70 degree temperature.

It will be manifest from the foregoing that by closing both the draft and check dampers at certain stages, a better modulated heat control is effected than in those constructions in which either the draft or check damper must be opened to a greater or less degree at all times. It will also be evident that the particular degree to which the dampers are opened is of no material importance to the present invention, as this may be varied by adjustment of the chain connections 31, with the arms 9 and 11, and also by adjustment of the chain 25 in the holes 29.

It is believed that the foregoing conveys a clear understanding of the principles and objects of this invention, and while I have illustrated but a single working embodiment thereof, it should be understood that various changes might be made in the construction and arrangement without departing from the spirit and scope of the invention as expressed above.

I claim:

1. A damper operator of the character described comprising a draft and a check damper, damper-operating means, and a connection between each damper and said operating means including a rod and a compression spring thereon, both being attached at one end to one part of said connection, and the spring being attached at its opposite end to the other part of said connection, and means operative between said rod and spring for limiting expansion of the other.

2. A damper operator of the character described comprising, in combination, a draft and a check damper, a damper-operated device having a draft and a check damper operating means operable for imparting damper closing and opening movements, and a flexible connection between each damper and its respective operated means including a spring device for holding its flexible connection contracted and taut from end to end during one operated position of its respective means and adapted to yield to permit its connection to be lengthened during another operated position of its said means.

3. A damper operator of the character described comprising, in combination, a draft and a check damper, a rotary operated device having diametrically opposed arms and adapted to be revolved in step-by-step movements of substantially ninety degrees each, and a flexible connection between one of said arms and the draft damper and another between the other arm and the check damper, each connection including a contractible spring device for holding it taut from end to end in the damper-closing position of its operating arm and for yieldingly lengthening to provide the necessary length of connection in the damper-opening position.

JOHN G. KNODLE.